United States Patent [19]

Jünger et al.

[11] 4,070,327

[45] Jan. 24, 1978

[54] PROCESS FOR IMPROVING THE MECHANICAL PROPERTIES OF NOVOLAK-CURED MOLDED ARTICLES

[75] Inventors: Hans Jünger, Troisdorf; Franz Weissenfels, Sieburg, both of Germany

[73] Assignee: Dynamit Nobel Aktiengesellschaft, Germany

[21] Appl. No.: 707,283

[22] Filed: July 21, 1976

[30] Foreign Application Priority Data

July 22, 1975 Germany ............................. 2532649

[51] Int. Cl.² ............................................... C08K 5/10
[52] U.S. Cl. .......................... 260/31.4 R; 260/31.8 T; 260/38; 260/DIG. 40
[58] Field of Search ...................... 260/31.8 T, 31.4 R, 260/38, DIG. 40

[56] References Cited

U.S. PATENT DOCUMENTS

| 1,923,938 | 8/1933 | Kyrides | 260/31.8 T X |
| 2,006,345 | 7/1935 | Carswell | 60/31.8 T X |
| 3,110,603 | 11/1963 | Reeves et al. | 260/31.4 R X |

Primary Examiner—Sandra M. Person
Attorney, Agent, or Firm—Craig & Antonelli

[57] ABSTRACT

A process for improving the strength and elasticity of molded articles containing inorganic oxide-type fillers and cured novolaks which includes the step of intermixing a dialkalene glycol dibenzoate with the novolak prior to curing the novolak and thereafter forming the molded articles in a conventional manner including curing with conventional agents.

12 Claims, No Drawings

PROCESS FOR IMPROVING THE MECHANICAL PROPERTIES OF NOVOLAK-CURED MOLDED ARTICLES

The present invention relates to a process for improving the mechanical properties of molded articles consisting predominantly of inorganic-oxide-type fillers and cured novolaks.

It is conventional to bond inorganic-oxide-type substances, such as, for example, various kinds of sand, with novolak-hexa [= hexamethylenetetramine] mixtures, wherein hexamethylenetetramine serves as the curing agent. Depending on the desired final usages, the binder or binding agent can be present in powder form, as a granulated material, dissolved in suitable solvents, or in the shape of a melt. In all cases, the curing step required for bonding takes place after the addition of 4–20% of hexamethylenetetramine based on solid novolak and molding under heat (at about 110°–300° C.).

Such molded articles must meet requirements of a great variety of properties, for example with respect to strength, and also with regard to elasticity. The latter is important, above all, if the molded articles are exposed to sudden changes in temperature. This is true especially if sand is utilized as the filler. Such resin-bound sands are utilized, inter alia, in foundries for the production of casting molds and cores. During the pouring of the liquid metal (at temperatures 1200° C to 1700° C), molds and cores are under great stresses both from the mechanical as well as thermal influences. The sand, present as "α-quartz" at normal temperature, passes over into "β-quartz" at 575° C. Between 870° and 1470° C, the stable phase is "tridymite," and between 1470° and 1710° C, "cristobalite" is present as the stable form. These changes in the modifications are, in part, connected with changes in volume which can lead, for example, in case of an insufficient elasticity of the binder, to structural displacement and crack formation in the mold.

The mechanical strength plays a part insofar as such molded articles must withstand differently strong external stresses during the course of the industrial handling and further processing.

The problem thus presented itself to improve the novolaks usable as binders in such a way that they exhibit, with an adequate mechanical strength, a sufficient elasticity particularly under the effects of varying temperatures. The addition of natural resins, such as, for example, colophony, "Vinsol", to novolaks does not yield the desired success. The conventional admixture of aromatic hydroxycarboxylic acids (such as salicylic acid, for example, German Patent 1,095,516) does not provide the required, comprehensive improvement, either.

It has now been found surprisingly that the abovedescribed properties of novolak-cured molded articles are affected positively in the desired direction by the addition of a dialkylene glycol dibenzoate in amounts of from 2 to 25%, by weight, preferably 5 to 15%, by weight, based on the weight of the resin. The effect attainable with dialkylene glycol dibenzoate was astonishing also because other aromatic esters, such as, for example, dioctyl phthalate or diphenyl cresyl phosphate, both of which are utilized as plasticizers in the same manner as the dialkylene glycol dibenzoates, showed no effect at all, or only a very minor effect.

Dialkylene glycol dibenzoates are conventional plasticizers used primarily in the manufacture of synthetic resin floor coverings. The dialkylene glycol dibenzoates suitable for use in the present invention can be characterized by the general formula:

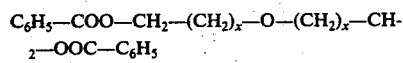

wherein $x$ can have values of from 1 to 4.

Dipropylene glycol dibenzoate is preferably employed.

It is unnecessary according to this invention to use, for example, the dipropylene glycol dibenzoate in the pure form. With the utilization of a technical quality, the same results are achieved. Characteristic data for such a technical dipropylene glycol dibenzoate are, for instance:

| | |
|---|---|
| Acid number | 0.2 – 0.7 |
| Iodine color number | 20 – 40 |
| Density at 20° C | 1.125 – 1.13 |
| Viscosity at 20° C | 200 – 300 cp. |
| OH-Number | 4 – 8 |

Novolaks along the lines of this invention are acid or alkaline-catalyzed condensation products of a phenol and an aldehyde in a molar ratio of $1 : \leqq 1$. The preferred phenols are phenol and mixtures of phenol and cresol containing up to 30% of cresol. The preferred molar ratios range between 1 : 0.5 and 1 : 0.9.

Suitable fillers are inorganic, oxide-type materials, such as, for example, the oxides of aluminum and silicon in their various forms of crystallization (e.g. corundum, quartz), chromium oxide, titanium dioxide (rutile), as well as mixed oxides of the aforementioned elements. Also the sands employed in foundries can be used as the fillers.

The amount of binder (novolak) is dependent on the fields of use of the thus-obtained molded articles and can range between 1 and about 60%, by weight, based on the weight of the filler. If quartz sands and/or aluminum oxides are used as the fillers, the preferred proportion of the binder ranges between 1% and 10%, by weight.

The above-mentioned improvements in accordance with this invention were proven to exist and/or measured on molded articles containing quartz sand of a definite composition and particle size as the filler. The novolaks provided with modifying agents or additives were utilized as the binders, as compared to a novolak without additives. To determine the mechanical strength, test rods were manufactured, and their flexural strength was measured after curing in the hot and cold conditions, respectively. To obtain an indication of the elasticity, a method customary in foundries for the determination of the thermal shock behavior was employed.

The novolak used in the examples set forth below was prepared by the condensation of phenol with formaldehyde in a molar ratio of 1 : 0.85 with the utilization of 0.07%, by weight, of sulfuric acid as the catalyst. Among other acids hydrochloric acid, oxalic acid, and p-toluene-sulfonic-acid are also possible as catalyst. After removal of the volatile components by vacuum distillation and taking up the thus-obtained novolak melt in an alcohol-water mixture (8% water and 92% alcohol, i.e.), a novolak solution was obtained having a viscosity of 1560 cp. with a solids content of 66%. This alcoholic solution was combined with dipropylene glycol dibenzoate, as well as with other modifiers, different as compared thereto. It is likewise possible without any difficulties to admix the respective modifier to the novolak in the molten condition. After discharging the modifier-containing melt, the latter can be granulated in suitable apparatus. These granules can then also be utilized as the binder, but in this case the application to the sand must be carried out by way of the molten condition.

EXAMPLES 1-7

A novolak solution obtained in accordance with the above directions was combined with the amounts of dipropylene glycol dibenzoate (DPGDB) hereinafter set forth in Table 1, as well as with other plasticizers for comparison purposes. Thereupon, 3.3 parts by weight of this resin solution was mixed intimately with 0.33 part by weight of hexamethylenetetramine and 100 parts by weight of "Duinger" sand 12b, and the thus-obtained mixture was tested for its flexural strength and thermal shock resistance.

Table 1
Thermal Shock Resistance and Flexural Strength of Novolak-Cured Sands
Modifiers of the Novolak

|  |  | Without Additive | DOP (7.5%) | "Desavin" (5%) | DPGDB (6%) | (pure) (8%) | DPGDB (10%) | (technical) (8%) |
|---|---|---|---|---|---|---|---|---|
| Example No. |  | 1 | 2 | 3 | 4 | 5 | 6 | 7 |
| Thermal Shock Resistance Value (seconds) |  | 105 | 112 | 111 | 147 | 140 | 135 | 145 |
| Low-Temperature Flexural Strength (N/cm$^2$) After | 15" | 400 | 200 | 280 | 700 | 700 | 710 | 680 |
|  | 30" | 550 | 400 | 515 | 890 | 980 | 1000 930 |  |
|  | 45" | 550 | 395 | 585 | 900 | 1000 | 1000 | 980 |
|  | 60" | 540 | 450 | 475 | 890 | 990 | 990 | 990 |
|  | 120" | 580 | 450 | 475 | 900 | 980 | 990 | 990 |
| High-Temperature Flexural Strength (N/cm$^2$) After | 15" | 160 | 105 | 117 | 230 | 240 | 230 | 235 |
|  | 30" | 175 | 118 | 150 | 270 | 270 | 280 | 250 |
|  | 45" | 180 | 145 | 185 | 280 | 270 | 290 | 270 |
|  | 60" | 180 | 180 | 150 | 300 | 300 | 310 | 300 |
|  | 120" | 170 | 180 | 150 | 290 | 300 | 310 | 300 |

DOP = Dioctyl Phthalate
"Desavin" = Diphenoxyethyl Formal
DPGDB (technical) = Unpurified DPGDB with the heretofore described characteristics To determine the flexural strength, test rods were produced in a Roeper core shooter within a core box heated to 250° C. The residence time of the rods after shooting in the core box can likewise be seen from Table 1. The high-temperature flexural strength was determined directly after discharge from the core box by means of a "+GF+" flexural strength testing apparatus. The low-temperature flexural strength was measured after cooling the rods for a period of at least two hours in the same apparatus.

The thermal shock resistance was measured as follows: In a suitable mold, heated to 250° C, a mask-like disk of a thickness of 10 mm. was produced by pouring in the resin-enveloped sand. After hardening and cooling, the disk is placed under a thermal load of 800° C on one side by means of a reflector burner with a quartz glass cover. The time is measured until the disk ruptures audibly on the flattened side. This time period serves as a measure for the thermal shock resistance. The longer the disk withstands the thermal load, the higher is the thermal shock resistance.

EXAMPLE 8

This example demonstrates that also novolak in the undissolved form (as a melt) can be used for binding purposes and results in the aforementioned improvements if modified in accordance with this invention.

The novolak resin utilized herein was the resin sold by Dynamit Nobel AG., Troisdorf, under the trade name of "T 42."

Prior to solidification, 6 parts by weight of dipropylene glycol dibenzoate was added to the melt of this resin. Thereafter, the melt was poured and comminuted after cooling.

The sand was enveloped by this binder by mixing 100 parts by weight of "Halterner" sand H 32 with 1.8 parts by weight of the modified resin at 120°-130° C. After a homogeneous mixture was obtained, 12.5% by weight of hexamethylenetetramine, based on the resin, was added thereto, dissolved in two to three times the amount of water. The mixture was cooled. Thereafter, 0.35% by weight of calcium stearate, based on the sand, is furthermore mixed therewith.

The low-temperature flexural strength was tested as set forth in connection with Examples 1-7. The thus-obtained values are indicated in Table 2 below.

Table 2

| Flexural Strength (kp/cm$^2$) of Novolak-Cured Sands at 20° C | | | | | |
|---|---|---|---|---|---|
| | Strength After: | | | | |
|  | 20" | 30" | 45" | 60" | 120" |
| Without Adding DPGDB | 23 | 27 | 38 | 52 | 55 |
| With the Addition of DPGDB | 24 | 33 | 40 | 62 | 62 |

What is claimed is:

1. A process for increasing the strength and elasticity of molded articles consisting predominantly of inorganic, oxide-type fillers and cured novolaks, which comprises prior to the curing of the novolak containing said filler intermixing the novolak with a dialkylene glycol dibenzoate, and thereafter manufacturing the molded articles according to a conventional procedure.

2. A process according to claim 1, wherein dipropylene glycol dibenzoate is utilized as the dialkylene glycol dibenzoate.

3. A process according to claim 1, wherein the dialkylene glycol dibenzoate is intermixed with an alcoholic solution of the novolak.

4. A process according to claim 1, wherein the dialkylene glycol dibenzoate is intermixed with a melt of the novolak.

5. A process according to claim 1, wherein from 2 to 25% by weight of the dialkylene glycol dibenzoate is intermixed with the novolak, based on the weight of the novolak.

6. A process according to claim 1, wherein the novolak is a condensation product of a phenol and formaldehyde in a molar ratio of 1:0.5 to 1:0.9

7. A process according to claim 1, wherein said novolak and filler are contained in such proportions that the novolak ranges between 1% and about 60% by weight based on the weight of the filler.

8. A process according to claim 7, wherein said filler comprises an oxide of aluminum, an oxide of silicon, chromium oxide, titanium dioxide and mixed oxides of aluminum, silicon, chromium or titanium.

9. A process according to claim 1, wherein said dialkylene glycol dibenzoate is represented by the general formula: $C_6H_5—COO—CH_2—(CH_2)_x—O—(CH_2)_x—CH_2—OOC—C_6H_5$ wherein x is from 1 to 4.

10. A process according to claim 5, wherein said dialkylene glycol dibenzoate is represented by the general formula: $C_6H_5—COO—CH_2—(CH_2)_x—O—(CH_2)_x—CH_2—OOC—C_6H_5$ wherein x is from 1 to 4.

11. A process according to claim 10, wherein the novolak is a condensation product of phenol or a mixture of phenol and up to 30% of cresol, and formaldehyde in a molar ratio of 1:0.5 to 1:0.9.

12. A process for increasing the strength and elasticity of a molded article consisting essentially of at least one inorganic oxide-type filler and a cured novolak, which comprises intermixing a novolak resin and from 2 to 25% by weight of an dialkylene glycol dibenzoate based on the weight of the resin, said dibenzoate being represented by the formula: $C_6H_5—COO—CH_2—(CH_2)_x—O—(CH_2)_x—CH_2—OOC—C_6H_5$ wherein x is from 1 to 4, thereafter mixing the resulting admixture of resin and dibenzoate with 4–20% by weight of hexamethylenetetramine and at least one inorganic oxide-type filler to form another admixture, the resin being in an amount between 1 and 60% by weight based on the weight of the filler, and thereafter curing and molding the another admixture with heat to produce said molded article.

* * * * *